United States Patent Office 3,475,415
Patented Oct. 28, 1969

3,475,415
PROCESS FOR THE PREPARATION OF 1,3-DIHY-
DRO-2-OXO-5-ARYL - 2H - 1,4 BENZODIAZEPINES
BEARING IN THE 3-POSITION THEREOF, AN
ESTERIFIED CARBOXY GROUP
Joseph Hellerbach, Basel, Switzerland, and Arthur
Stempel, Teaneck, and Leo Henryk Sternbach,
Upper Montclair, N.J., assignors to Hoffmann-La
Roche Inc., Nutley, N.J., a corporation of New
Jersey
No Drawing. Filed Dec. 5, 1966, Ser. No. 598,939
Claims priority, application Switzerland, Dec. 9, 1965,
17,027/65
Int. Cl. C07d 53/06, 57/00; A61k 27/00
U.S. Cl. 260—239.3                                8 Claims

ABSTRACT OF THE DISCLOSURE

This invention is directed to a process for the preparation of 1,3-dihydro-2-oxo-5-aryl-2H-1,4-benzodiazepines bearing in the 3-position thereof, an esterified carboxy group. The process is effected by reacting the appropriate 1,3-dihydro 2-oxo-5-aryl-2H-1,4-benzodiazepines with a derivative of carbonic acid such as ethyl chlorocarbonate, diethyl carbonate, etc., preferentially in the presence of a strongly basic condensation agent. The products of the process are useful as sedatives, tranquilizers, anti-convulsants and muscle relaxants.

---

The present invention relates to a process for preparing compounds of pharmacological value. More particularly, the present invention relates to a process for the preparation of 1,3-dihydro-2-oxo-5-phenyl-2H-1,4-benzodiazepines bearing in the 3-position thereof, an esterified carboxy group.

Specifically, the present invention relates to a process for preparing benzodiazepines of the formula

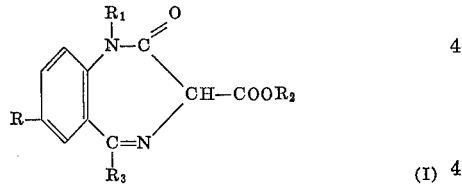

(I)

wherein R is selected from the group consisting of halogen, hydrogen, nitro, trifluoromethyl and cyano; $R_1$ is selected from the group consisting of hydrogen, lower alkyl and amino-lower alkyl; $R_2$ is selected from the group consisting of lower alkyl, phenyl and benzyl and $R_3$ is selected from the group consisting of phenyl, halo-mono substituted phenyl and pyridyl.

The compounds of the Formula I are prepared by a reaction route which involves condensing a corresponding 1,4-benzodiazepine which is unsubstituted in the 3-position, i.e. bears only hydrogen in position-3, with a carbonic acid derivative. The above-mentioned condensation is preferentially carried out in the presence of any suitable strongly basic condensation agent, such as sodium hydride, sodamide, potassium tertiary butoxide and the like.

More particularly, a compound of the Formula I above is prepared by condensing a compound selected from the group consisting of compounds of the formula

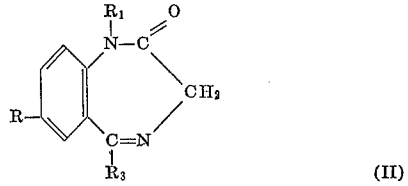

(II)

wherein R, $R_1$ and $R_3$ have the same meaning as ascribed thereto hereinabove with a carbonic acid derivative selected from the group consisting of a compound of the formula $$CO(OR_2)_2 \qquad (III)$$

wherein $R_2$ has the same meaning as ascribed thereto hereinabove;

and ethyl chlorocarbonate.

Preferred starting materials of the Formula II above are those wherein R is selected from the group consisting of nitro and halogen, most advantageously, chlorine. When $R_3$ is a halo-mono-substituted phenyl group, the halogen atom is preferentially joined in the 2-position of the phenyl group and in a preferred embodiment, is fluorine. In a particularly advantageous aspect of the present invention, a starting material of the Formula II above is employed;

(1) wherein R represents chlorine, $R_1$ is methyl and $R_3$ phenyl;
(2) wherein R represents chlorine, $R_1$ hydrogen and $R_3$ phenyl;
(3) wherein R represents nitro, $R_1$ hydrogen, and $R_3$ phenyl; and
(4) wherein R represents chlorine; $R_1$ diloweralkyl-amino-lower alkyl, e.g., diethylaminoethyl and $R_3$ is ortho-fluorophenyl.

Preferentially, the condensation is effected in an inert organic solvent medium such as N,N'-dimethylformamide or any other suitable inert solvent. The reaction can be performed at any suitable temperature. Most advantageously, it is performed at a temperature range from about 0° to about 25° C.

The term "halogen" as found herein is intended to represent all four halogen atoms, i.e. fluorine, iodine, bromine and chlorine. Preferred among the halogen atoms, are chlorine, bromine and fluorine. As is noted above, when halogen is on the fused benzo portion of the compounds of the formulas I and II above, it is most preferentially chlorine. When halogen is on the 5-phenyl ring, it is preferred that it be fluorine. The expression "lower alkyl" represents a saturated straight or branched chain hydrocarbon radical containing up to 7 carbon atoms such as methyl, ethyl, isopropyl, propyl and the like. The term "amino-lower alkyl" comprehends mono-lower alkyl-amino-lower alkyl groups and di-lower alkyl-amino-lower alkyl groups (wherein lower alkyl is as defined above). A preferred amino-lower alkyl group for the purposes of the present invention is a di-lower alkyl amino lower alkyl group, such as diethyl amino ethyl.

The compounds of the Formula I above are sedatives, tranquilizers, anti-convulsants and muscle relaxants. They find use as medicaments for enteral and parenteral application in pharmaceutical preparations. Such preparations can be prepared by mixing a compound of the Formula I with a pharmaceutical organic or inorganic inert carrier material such as water, gelatin, lactose, starch, magnesium stearate, talc, vegetable oils, gums, polyalkylene glycols, Vasoline and the like. The pharmaceutical dosage forms can be provided in solid forms (e.g. as tablets, dragees, suppositories, capsules and the like) or in liquid form (such as solutions, suspensions or emulsions). They may be sterilized and/or contain additives such as preserving, stabilizing, wetting or emulsifying agents, salts for varying the osmotic pressure or buffers. They can also contain other therapeutically useful substances.

The following examples are illustrative but not limitative of the present invention. All temperatures are stated in degrees centigrade.

EXAMPLE 1

1.2 g. (0.025 mol) of a 50% suspension of sodamide in mineral oil is added to a solution of 2.7 g. (0.01 mol) of 7 - chloro - 1,3 - dihydro - 5 - phenyl - 2H - 1,4-benzodiazepin-2-one in 50 ml. of tetrahydrofuran. The mixture is stirred at 25° for one hour and 1.3 g. (0.015 mole) of diethyl carbonate are thereafter added. The mixture is stirred at 25° for a further 2 hours, poured into ice water and thereafter the pH of the solution is adjusted to 7 by careful addition of acetic acid. The solution is extracted with ether, the extract washed with water, dried and concentrated in vacuum. There remains behind 7 - chloro - 1,3 - dihydro - 2 - oxo - 5 - phenyl - 2H - 1,4-benzodiazepine-3-carboxylic acid ethyl ester, which melts at 226–229° after recrystallization from ethyl acetate.

EXAMPLE 2

To a solution of 10 g. of diazepam in 100 ml. of dry dimethylformamide, cooled to 5°, is added 1.88 g. of a paste containing 50% sodium hydride and 50% of mineral oil. The mixture is stirred for 15 min. at 5° and then 14.7 g. of diethyl carbonate is added. The resultant mixture is allowed to come to room temperature and thereafter the stirring is continued for 21 hours. The mixture is then diluted with a large amount of water and extracted with chloroform. The chloroform layer is separated, washed with water, dried over sodium sulphate and concentrated in vacuo. The residue is diluted with a mixture of ether (200 ml.) and water (400 ml.). The so-formed mixture is filtered. The filtrate which consists of two phases is separated. The ether phase is diluted with chloroform, dried with sodium sulphate, filtered and concentrated to dryness. The residue is dissolved in a small amount of ether and the resultant medium is filtered. The filtrate upon concentration yield crystals melting at 171–173°.

The last-mentioned crystalline material is added to methanol and the resultant medium filtered. The filtrate is concentrated to dryness and the residue is crystallized from methanol yielding a material melting at 181–184°. This crude reaction product which consists of a mixture of colorless needles and prisms is warmed to 60° with a small amount of methanol (the needles dissolve and the prisms do not). The prisms are removed by hot filtration. The so-obtained precipitate is then recrystallized from methanol to give prisms of 7-chloro-1,3-dihydro-1-methyl-2-oxo-5-phenyl-2H-1,4-benzodiazepine-3-carboxylic acid ethyl ester melting at 193.5–195.5°.

We claim:

1. A process for the preparation of a compound of the formula

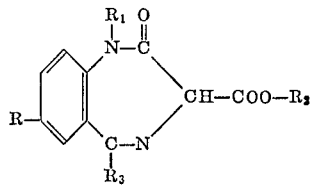

wherein R is selected from the group consisting of halogen, nitro, trifluoromethyl and cyano; $R_1$ is selected from the group consisting of hydrogen, lower alkyl and amino lower alkyl; $R_2$ is selected from the group consisting of lower alkyl, phenyl or benzyl and; $R_3$ is selected from the group consisting of phenyl, halo-mono-substituted phenyl and pyridyl which comprises reacting a compound selected from the group consisting of a compound of the formula

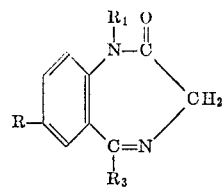

wherein R, $R_1$ and $R_3$ are as above with a carbonic acid derivative selected from the group consisting of a compound of the formula $$CO(OR_2)_2$$

wherein $R_2$ has the same meaning as above and ethyl chlorocarbonate.

2. A process as defined in claim 1 wherein the reaction defined therein is effected in the presence of a basic condensation agent.

3. A process as defined in claim 2 in which the condensation agent employed is sodium hydride.

4. A process as defined in claim 1 wherein the starting material employed is of the formula 7-chloro-1,3-dihydro-1-methyl-2-oxo-5-phenyl-2H-1,4-benzodiazepine.

5. A process as defined in claim 1 wherein the carbonic acid derivative utilized is a di-lower alkyl carbonate.

6. A process as defined in claim 5 wherein the di-lower alkyl carbonate utilized is diethyl carbonate.

7. A process as defined in claim 4 wherein the carbonic acid derivative utilized is a di-lower alkyl carbonate.

8. A process as defined in claim 7 wherein the di-lower alkyl carbonate utilized is diethyl carbonate.

References Cited

UNITED STATES PATENTS 3,311,612   3/1967   Reeder et al. _____ 260—239.3

HENRY R. JILES, Primary Examiner

R. T. BOND, Assistant Examiner

U.S. Cl. X.R.

424—244

UNITED STATES PATENT OFFICE
CERTIFICATE OF CORRECTION

Patent No. 3,475,415      Dated October 28, 1969

Inventor(s) Joseph Hellerbach, Arthur Stempel and Leo Henryk Sternbach

It is certified that error appears in the above-identified patent and that said Letters Patent are hereby corrected as shown below:

Column 3, lines 50-55

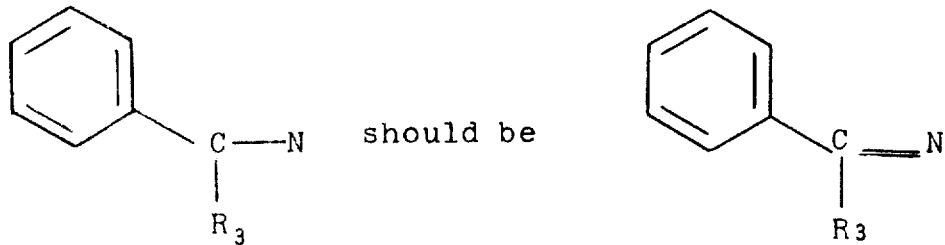

Page 7, line 3 of our specification

SIGNED AND SEALED
SEP 22 1970

(SEAL)
Attest:

Edward M. Fletcher, Jr.
Attesting Officer

WILLIAM E. SCHUYLER, JR.
Commissioner of Patents